DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 21, 1970

873 O.G. 687

T873,013

PROCESS FOR SOLID PHASE POLYMERIZATION OF POLYETHYLENE TEREPHTHALATE

Charles J. Kibler, P.O. Box 511, Kingsport, Tenn. 37662

Continuation of application Ser. No. 693,769, Dec. 27, 1967. This application Oct. 23, 1969, Ser. No. 868,946

Int. Cl. C08g *17/003*

U.S. Cl. 260—75

No Drawing. 21 Pages Specification

Glycol (ethylene, primarily) terephthalate (may include small amount of other diacids) is partially polymerized to amorphous polyester prepolymer melt having an inherent viscosity of about 0.2–0.65 which is cooled rapidly (quenched to a solid), heated at about 120–140° C. to partially crystallize the solid, and particles of the solid are polymerized at about 200–235° C. to an inherent viscosity of at least about 0.6 and at least 0.15 unit higher than the prepolymer being polymerized. The polymerization can be in a vacuum with stirring, or in a fluidized state using an inert gas. The improved polyesters have sharp melting points, and fibers have low harsh count and very few slubs.